Figure 1:
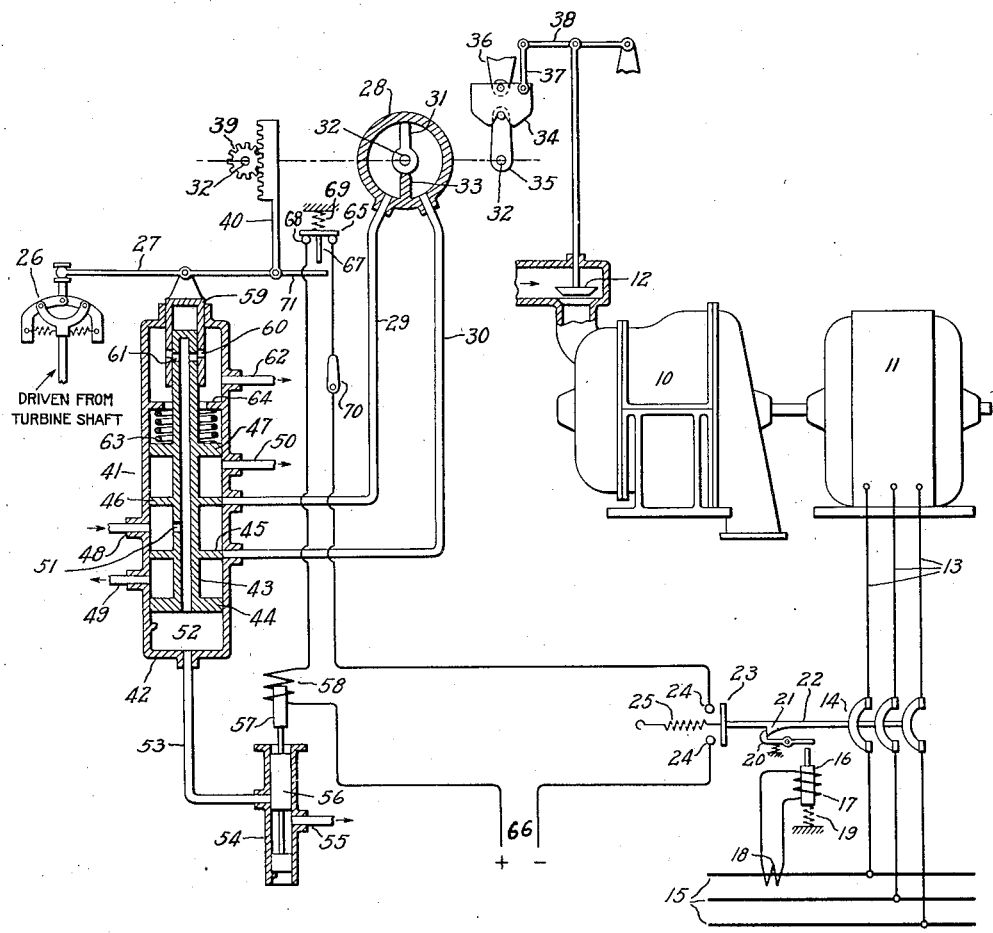

March 12, 1935.     R. H. COLLINGHAM     1,994,121
ELASTIC FLUID TURBINE
Filed Feb. 20, 1934     2 Sheets-Sheet 1

Inventor:
Robert H. Collingham,
by Harry E. Dunham
His Attorney.

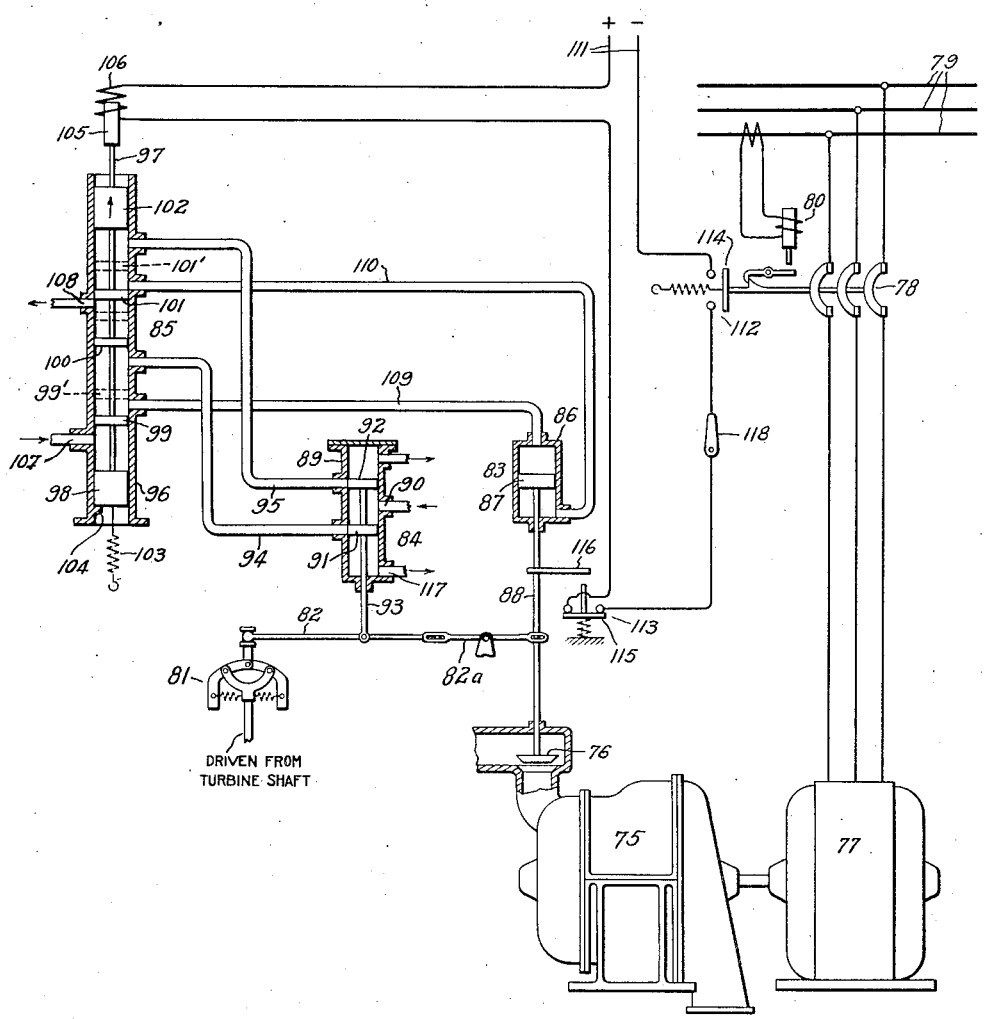

Patented Mar. 12, 1935

1,994,121

UNITED STATES PATENT OFFICE 1,994,121

ELASTIC FLUID TURBINE

Robert H. Collingham, Rugby, England, assignor to General Electric Company, a corporation of New York Application February 20, 1934, Serial No. 712,245
In Great Britain February 16, 1933

10 Claims. (Cl. 290—40)

The present invention relates to elastic fluid turbines and like engines for driving electric generators connected to a line or the like, more specifically to regulating mechanisms for controlling the flow of elastic fluid to such turbines or engines.

It is well known that wherever an elastic fluid turbine or engine drives an electric generator connected to a power line, excessive overspeeding may occur when heavy loads are thrown off the turbo-generator. This overspeeding is caused by the time lag between the load change and the closing of the admission valve. The overspeeding is also due to the continued flow of elastic fluid into the turbine or engine during the valve closing period. In modern turbine designs the rotating parts are usually of light weight with respect to the large output and these rotating parts have not sufficient inertia to absorb the energy in the elastic fluid when the load is suddenly thrown off without causing a considerable, undesirable rise in speed which may be sufficient to cause the emergency governor to trip and shut down completely the supply of elastic fluid to the turbine.

The object of my invention is to provide an improved construction and arrangement for regulating mechanisms of elastic fluid turbines and like engines whereby the time lag of the governor, that is, the period of time passing between a change in load and the positioning of the valve in accordance with the load change is considerably reduced.

For a consideration of what I believe to be novel and my invention, attention is directed to the following description and the claims appended thereto in connection with the accompanying drawings which form a part of my specification.

In the drawings, Fig. 1 represents a turbo-generator provided with a regulating mechanism in accordance with my invention, and Fig. 2 shows a modification of the regulating mechanism.

The turbo-generator in Fig. 1 comprises an elastic fluid turbine 10 coupled with an electric generator 11 of the three-phase alternating current synchronous type. The turbine has an inlet provided with an inlet valve 12 for controlling the flow of elastic fluid to the turbine and accordingly the load output of the generator 11. The latter is connected by conductors 13 through a switch or circuit breaker 14 to a power line 15. The circuit breaker 14 is automatically opened as the flow of current in the line 15 is decreased to a certain value. This is accomplished by a relay having a core 16 and an under-current trip coil 17 which latter is energized from the secondary 18 of a current transformer in response to the flow of current in line 15. The core 17 is biased by a compression spring 19 in upward direction and held downward by the magnetic flux produced in the coil. Adjacent the coil is a trip finger 20 engaging a latch 21 on an arm 22 of the circuit breaker 14. A contact making member or switch 23 for over-bridging contacts 24 in a circuit which will be described hereinafter is fastened to the arm 22. The circuit breaker is held in closed position by the finger 20 and when this finger is removed, the circuit breaker is biased toward opening position by a tension spring 25. During operation a decrease in current in the line 15 causes the magnet 16 to move upward under the action of the compression spring 19 to release the finger 20, resulting in opening of the circuit breaker 14, that is, interrupting of the circuit 13. The inlet valve 12 of the turbine is moved in response to speed changes of the turbo-generator. This is accomplished by a speed governing mechanism comprising a speed responsive device such as a speed governor 26 connected to the left-hand end of a floating lever 27. Movement of the lever by the speed governor due to change in speed is transmitted to the valve 12 through the intermediary of a motor and a control member for the motor. The motor in the present instance comprises a fixed cylinder 28 connected to conduits 29 and 30 through which actuating fluid such as oil may be supplied to or discharged from the cylinder. Provided in the cylinder is a rotatable vane 31 having a shaft 32. A wall portion or partition 33 of the cylinder and the vane define two chambers in the cylinder. When actuating fluid is supplied to the cylinder, for example, through conduit 29 and discharged from the conduit 30, the vane is turned in clockwise direction. Movement of the vane is transmitted through the shaft to the valve by means including a blade 34 engaging a cam member 35 fixed to the shaft and having a fulcrum 36. A portion of the blade is connected to a link 37 which in turn is pivoted to the left-hand end of a fulcrumed lever 38 having an intermediate point connected to the valve 12. Rotation of the vane in clockwise direction causes the cam 35 to move clockwise whereby the blade 34 is turned in counterclockwise direction about its fulcrum 36 and moves the link 37 upward to open the valve. Similarly, counterclockwise movement of the vane 31 causes closing of the valve 12. A pinion 39 is fastened to the shaft 35 and engages a resetting rack rod 40 having a lower end fastened to the floating lever 27. The supply of actuating fluid to the hydraulic motor and the draining of fluid therefrom in response to movement of the governor takes place through a control member 41. This control member according to my invention comprises an outer casing 42, a hollow spindle or stem 43 having four heads, 44, 45, 46 and 47. The heads 45 and 46 normally register with ports in the outer casing which ports are connected to the conduits 29 and 30 respectively. A port 48 between the heads 45 and 46 is connected to a source of actuating fluid such as oil under pressure. A second port 49 in the outer casing between the heads 44 and 45 and a third port 50 in the outer casing between the heads 46 and 47 are connected to discharge conduits for draining actuating fluid from the motor. The spindle, as pointed out above, has a bore which communicates with the inlet conduit 48 through a relatively small opening 51 between the heads 45 and 46. At the lower end the bore communicates with a chamber 52 defined in the lower casing. This chamber is connected by a conduit 53 to a valve 54 having a discharge conduit 55 and a head 56, which latter normally prevents the flow of fluid from conduit 53 to conduit 55. The head 56 is normally positioned as indicated in the drawings. The valve 54 is operated by an electromagnetic relay including a core 57 attached to the head 56 and energized by a coil 58.

The control member or valve 41 also includes a sleeve 59 pivoted to an intermediate point of the floating lever 27 and slidably engaging the hollow spindle 43. The sleeve 59 has an opening or port 60 which communicates with openings 61 in the spindle to permit the flow of actuating fluid from the bore of the spindle through the openings 60—61. The fluid passing through these openings is discharged through a drain conduit 62 connected to the upper casing portion. The oil conducted through the inlet port 48 flows through the opening 51, the bore of the spindle into the chamber 52 and biases the spindle together with the heads in upward direction. This biasing force is normally compensated by a compression spring 63 surrounding the spindle and arranged between the head 47 and an abutment 64.

The normal operation of the arrangement is as follows: A normal increase in speed, due to a decrease in load, causes the flyweights of the speed governor 26 to move outward, whereby the lever 27 is turned downward about its pivoted connection with the rod 40 and thereby moves sleeve 59 in downward direction. This effects an increase of the opening area of the openings 60, 61, whereby the pressure in the lower chamber 52 is reduced and permits downward movement of the spindle with the heads by the action of the compression spring 63. This downward movement permits flow of actuating fluid from the inlet port 48 through the conduit 30 into the right-hand chamber of the hydraulic cylinder 28 and draining of actuating fluid from the left-hand chamber of the cylinder 28 through conduit 29, the valve 41 and the discharge port 50. The vane 31 thereby is turned in counterclockwise direction, causing similar movement of the cam 35, resulting in downward movement of the link 37 and closing movement of the valve 12. This effects a reduced flow of elastic fluid to the turbine and accordingly a decrease in speed. The movement of the vane 32 is also transmitted through the pinion 39 on the shaft 35 to the resetting rack rod 40 which under the above conditions moves upward, causing similar movement of the sleeve 59 to restore the latter to its original position.

A decrease in speed, due to an increase in demand for load, causes similar movement of the mechanism but in opposite direction. It will be readily understood that a certain period of time elapses between a change in load, the actuation of the speed governor due to this change and the final setting of the valve in accordance with the load change. As stated above, this time lag may cause actuation of the emergency governor, not shown, resulting in shutting off of the turbine whenever a sudden change of load of a considerable magnitude occurs, for example, when the circuit breaker is opened. This time lag is reduced or the closing of the inlet valve is accelerated according to my invention by the provision of means which are operated in response to the opening of the circuit breaker, that is, in response to considerable load changes independent of the speed governor operation. This means comprises the valves 41 and 54 together with an electric auxiliary circuit including the coil 58, a relay or switch 65 and the contacts 24 with the contact-making member 23. In the present example the coil 58 has one end connected to a suitable source of electric energy 66 and the other end to the relay 65 which during normal operation is closed. It comprises a contact-making member 67 normally biased to over-bridge contacts 68 by the action of a biasing spring 69. The circuit also includes a switch 70 which may be manually operated to permit starting of the turbine as will be described hereinafter.

This auxiliary circuit is closed in response to a sudden considerable decrease in load sufficient to cause opening of the circuit breaker 14. This causes the contact-making member 23 to over-bridge the contacts 24 and thus to close the auxiliary circuit. The coil 58 then is energized and causes upward movement of the head 56, that is, opening of the auxiliary valve 54 to permit actuating fluid to be discharged from the lower chamber 52 of the valve 41 through the auxiliary valve 54. The discharge of fluid from chamber 52 permits rapid downward movement of the control valve spindle whereby actuating fluid is conducted through port 48, the conduit 30, to the right-hand chamber of the hydraulic cylinder, and actuating fluid is discharged from the left-hand chamber of the cylinder, resulting in rapid closing movement of the valve 12. The closing movement is interrupted as soon as the valve has reached a certain position. This is accomplished according to my invention by the provision of means interrupting the auxiliary circuit to de-energize the coil 58. In the present instance I have shown the floating lever 27 as including a right-hand extension 71. As the shaft 32 is rotated in a counterclockwise direction to close the valve, it causes upward movement of the resetting rack rod 40 which in a certain position corresponding to a fixed position of the turbine inlet valve causes the extension 71 to force the contact-making member 67 away from the contacts 68. The de-energizing of the coil 58, due to opening of the auxiliary circuit, causes the valve head 56 to drop down into its normal position whereby the discharge of actuating fluid from the chamber 52 through the conduit 53 is interrupted and pressure may be built up in the chamber 52. This building-up or restoring of pressure in chamber 52 causes the valve spindle 43 to move upward until the valve heads 45 and 46 register with the port connections to conduits 29 and 30 to interrupt further flow of fluid through said conduits. The turbine then continues to run idle with the circuit breaker 14 open.

During starting of the turbine, the starting switch 70 is opened to insure the coil 58 being de-energized and the valve head 56 being in closed position to permit building up of fluid pressure in the chamber 52 of the control valve. The starting switch 70 is necessary because during starting the contact member 23 over-bridges contacts 24 and the rack rod 40 may be in a position in which the extension 71 does not interrupt the connection between contacts 68.

The modification shown in Fig. 2 comprises a turbine 75 having an inlet valve 76 for controlling the flow of elastic fluid to the turbine. The latter drives an electric generator 77 connected by means including a circuit breaker 78 to a power line 79. The circuit breaker 78, corresponding to circuit breaker 14 in Fig. 1, is opened by means including an under current trip coil 80 when the demand for load reaches a predetermined minimum value. The valve 76 for the turbine is moved by a load control mechanism in response to the demand for load from the generator. This mechanism comprises a speed governor 81 driven from the turbine shaft and having a sleeve connected to the left-hand end of a floating lever 82, the right-hand end of the latter being connected through fulcrumed lever 82ª to the stem of the valve 76. Movement of the valve 82 in response to a load change on the turbine is transmitted to the valve 76 by means including a hydraulic motor 83, a control member or pilot valve 84 for the motor and a distributing pilot valve 85. The pilot valve 84 and the distributing pilot valve 85 form in substance control valve means for the motor corresponding to the control valve means 41 in Fig. 1. The hydraulic motor 83 comprises a cylinder 86 having a piston 87 slidably movable therein and connected by a stem 88 to the stem of the valve 76. The stem 88 in substance forms an extension of the valve stem. The pilot valve 84 comprises a cylinder 89 having an inlet port 90 connected to a suitable source of actuating fluid such as oil under pressure, and valve heads 91 and 92 connected to a stem 93 which latter is pivoted to an intermediate point of the floating lever 82. The pilot valve heads 91 and 92 normally cover ports connected by means of pipes 94 and 95 to the distributing valve 85. The latter has an outer cylinder 96, a stem 97 with five valve heads 98, 99, 100, 101 and 102 rigidly secured thereto. The stem 97 with its valve heads is normally biased in downward direction by means of spring 103, the normal position being fixed by a stop 104. A core 105 of an electro-magnet having a coil 106 is fixed to the upper end of the stem 97. The coil 106 forms a part of an auxiliary circuit which will be described hereinafter. The distributing valve casing 96 has a port 107 connected to a source of actuating fluid such as oil under pressure and another port 108 connected to a conduit for draining actuating fluid from the distributing valve. As will be readily seen from the drawings, the distributing valve normally forms a means for connecting the pilot valve 84 to the hydraulic motor 83, the hydraulic motor 83 being connected to the distributing pilot valve by conduits 109 and 110, and the distributing pilot valve normally establishes connection between conduits 109 and 94 and also between conduits 110 and 95.

The auxiliary circuit comprises the above mentioned electromagnet including the coil 106, a source of energy 111 and two switches 112 and 113. The switch 112 has a contact-making member 114 fixed to the rod of the circuit breaker 78 and normally held in open position, and the switch 113 has a contact-making member 115 normally biased toward closing position. The member 115 is actuated to open the auxiliary circuit by a member 116 attached to the rod 88 of the hydraulic motor.

The normal operation of the arrangement is as follows: If the demand for load from the turbo-generator increases, the speed of the turbine is reduced, whereby the speed governor 81 causes upward movement of the left-hand end of the floating lever 82. The latter then moves the pilot valve heads 91 and 92 upward, to uncover their ports and to permit the supply of actuating fluid through the port 90 of the pilot valve, the conduit 95, to the distributing pilot valve, and then through conduit 110 to the lower portion of the hydraulic cylinder 86. At the same time, actuating fluid is discharged from the upper portion of the hydraulic cylinder 86 through the conduit 109, the distributing pilot valve, the conduit 94, the pilot valve 84, whence the fluid is discharged through a drain conduit 117. The supply of fluid to the lower part of the cylinder 86 and the draining of fluid from the upper part thereof causes the piston 87 to move upward, resulting in opening travel of the inlet valve 76 and increased flow of elastic fluid to the turbine and accordingly increased load output. The upward movement of the piston 87 of the hydraulic cylinder also causes upward movement of the right-hand end of the fulcrumed lever 82, whereby the pilot valve heads 91 and 92 are moved downward to resume their original position. The levers 82 and 82ª form a follow-up mechanism between the motor 83 and the pilot valve or control member 84.

If the demand for load decreases, a similar movement of the various elements takes place in opposite direction, effecting closing of the turbine inlet valve. A considerable period of time elapses between the change in load, the response of the speed governor and the setting of the turbine inlet valve in accordance with the load change. This governor lag is undesirable, particularly when this load change is of considerable magnitude, such as when the circuit breaker 78 is opened. Opening of the circuit breaker 78 causes the load to be suddenly thrown off the turbine. Means are provided in accordance with my invention to effect in this case a closing of the turbine inlet valve and preventing the latter from being completely closed or, from another viewpoint, preventing the speed increase from assuming a magnitude which normally would cause actuation of the emergency governor. This is accomplished by my invention by means for automatically disconnecting the pilot valve and directly supplying actuating fluid to the hydraulic motor without affecting the speed governor operation. This automatically actuating means includes the distributing pilot valve and the auxiliary circuit described above.

Sudden opening of the circuit breaker, due to a sudden load change, causes closing of switch 112, whereby the auxiliary circuit is closed to energize the coil 106 from the source 111. This causes the core 105 together with the stem 97 and the heads of the distributing pilot valve to move upward into a position in which the valve head 101 assumes the dotted line position 101' and the valve head 99 assumes the position 99'. In this position, oil or like actuating fluid is discharged from the lower portion of the hydraulic cylinder 86 through the conduit 110 to the distributing valve, whence it is drained directly through the drain port 108. At the same time, actuating fluid is supplied to the upper part of the hydraulic cylinder from the port 107 of the distributing valve through the conduit 109. During this time the pilot valve 84 is disconnected from the hydraulic motor because the distributing pilot valve head 101 interrupts the connection between conduits 95 and 110 and the distributing pilot valve head 99 interrupts the connection between the conduits 94 and 109. The piston 87 of the hydraulic motor during this operation rapidly moves downward toward closing position of the valve. As the valve reaches a fixed position, the member 116 attached to the stem 88 opens the switch 113 of the auxiliary circuit. The coil 106 of the circuit then is de-energized and permits the distributing pilot valve to be moved down against the stop 104 under action of the tension spring 103 to resume its normal position. The turbine then continues to run idle.

During starting of the turbo-generator, the switch 112 is normally closed, whereas the switch 113 is open. As the turbine valve is gradually opened, the member 116 on its stem is moved away from the switch 113 and permits closing thereof, which would cause closing of the auxiliary circuit and energizing of the coil 106. As this would prevent the starting of the turbine, a switch 118 is provided in the auxiliary circuit. This switch is opened during the starting of the turbine.

With my invention I have accomplished an improved construction and arrangement of a control mechanism for elastic fluid turbines or like engines for driving electric generators or the like. The normal operation of the governing mechanism is substantially the same as that of any other known mechanism. The mechanism includes means for shortening the time lag of the governor and other elements associated therewith, that is the period of time which elapses between a considerable drop in load and the setting of the valve or valves of the turbine or engine in accordance with the load change.

Having described the method of operation of my invention, together with the apparatus which I now consider to represent the best embodiments thereof, I desire to have it understood that the apparatus shown is only illustrative and that the invention may be carried out by other means.

What I claim as new and desire to secure by Letters Patent of the United States, is:

1. The combination of an elastic fluid turbine, a generator driven by the turbine, a power line connected to the generator, an inlet valve for the turbine for controlling the flow of elastic fluid thereto, a control mechanism including a speed governor for positioning the valve in response to speed changes of the turbine, means in addition to the speed governor for effecting rapid closing movement of the inlet valve at sudden considerable decreases in load, and means automatically effective under any operating condition for rendering the last-named means inoperative at a certain position of the inlet valve to restore control of the valve position to the control mechanism.

2. The combination of an elastic fluid turbine having an inlet valve, a generator driven by the turbine, a power line, means including a circuit breaker connecting the generator to the power line, means including an under current trip coil for opening the circuit breaker at a fixed minimum load, a speed governing mechanism for controlling the inlet valve comprising a speed governor driven from the turbine, control valve means having a member connected to the speed governor, and a hydraulic motor connected to the inlet valve and receiving fluid through the control valve means, means for reducing the time lag of the speed governing mechanism to accelerate closing movement of the inlet valve at sudden considerable decreases in load comprising an auxiliary circuit including a switch automatically closed in response to opening of the circuit breaker for actuating the control valve means, and means effective under any operating condition cooperating with the last named means to automatically open the auxiliary circuit at a certain position of the inlet valve whereby the last named means is prevented from effecting complete closing of the inlet valve.

3. The combination of an elastic fluid turbine having an inlet valve, a speed governing mechanism for controlling the valve comprising a speed governor driven by the turbine, a motor for moving the valve, and a control member for the motor connected to the speed governor, auxiliary means for rapidly moving the valve towards closing position in response to a considerable sudden change in load comprising means for normally holding at least a part of the control member in a fixed position and means for automatically moving the control member without affecting the speed governor operation, and means effective under any operating condition for automatically rendering the auxiliary means inoperative at a certain position of the inlet valve to restore full control of the inlet valve to the speed governing mechanism.

4. The combination of an elastic fluid turbine having an inlet valve, a speed governing mechanism including a speed governor driven by the turbine, a control valve connected to the speed governor and a hydraulic motor connected to the inlet valve and the control valve, fluid pressure means for holding the control valve in an operative position during normal operation of the turbine, means for relieving the fluid pressure to permit movement of the control valve for rapidly closing the inlet valve at sudden considerable load changes, and means responsive to a certain inlet valve position effective under any operating condition for automatically rendering the last named means inoperative to again cause building up of fluid pressure for holding the control valve in an operative position.

5. The combination of an elastic fluid turbine having an inlet valve, a speed governing mechanism including a speed governor driven by the turbine, a control valve connected to the speed governor and a hydraulic motor connected to the inlet valve and the control valve, fluid pressure means for holding the control valve in an operative position during normal operation of the turbine, means for relieving the fluid pressure to permit movement of the control valve for rapidly closing the inlet valve at sudden, considerable load changes, the last named means including another valve and a mechanism for automatically actuating said other valve in response to sudden considerable load changes, and means effective under any operating condition for automatically rendering said mechanism inoperative to actuate said other valve after the inlet valve has reached a certain position.

6. The combination of an elastic fluid turbine having an inlet valve, a speed governing mechanism including a speed governor driven by the turbine, a control valve connected to the speed governor and a hydraulic motor connected to the inlet valve and the control valve, means for holding the control valve in an operative position during normal operation of the turbine, means for rendering the last named means inoperative to permit movement of the control valve for rapidly closing the inlet valve at sudden considerable load changes, the last named means including another valve and a mechanism for automatically actuating the valve in response to a sudden considerable load change, the mechanism comprising an electromagnet having a core connected to the other valve, a coil and a circuit for the coil receiving current in response to a sudden considerable load change, and means for preventing under any operating condition complete closing of the control valve in response to sudden load changes comprising a switch in the coil circuit and means for automatically opening the switch when the hydraulic motor reaches a certain position.

7. The combination of an elastic fluid turbine having an inlet valve, a speed governing mechanism including a speed governor driven by the turbine, a control valve connected to the speed governor and a hydraulic motor connected to the inlet valve and the control valve, means for holding the control valve in an operative position during normal operation of the turbine, means for rendering the last named means inoperative to permit movement of the control valve for rapidly closing the inlet valve at sudden considerable load changes, the last named means including another valve and a mechanism including an electromagnet for automatically actuating the said other valve in response to a sudden considerable load change, and means effective under any operating condition for automatically deenergizing the magnet in a certain position of the inlet valve to cause the control member to assume its normal operating position.

8. The combination of an engine having an inlet valve for controlling the supply of actuating fluid to the engine, a generator driven by the engine, a power line, a circuit breaker connecting the generator to the line, a hydraulic motor for moving the valve, a speed governor driven by the engine and a control valve connected to the motor for controlling the flow of fluid into the hydraulic motor, means for rapidly moving the inlet valve under action of the motor in response to opening of the circuit breaker comprising an auxiliary circuit having a switch actuated by the circuit breaker and an electromagnet connected to the control valve, and means for limiting closing movement of the inlet valve comprising another switch in the auxiliary circuit and a member fixed to the inlet valve to open the last named switch in a fixed position of the inlet valve.

9. The combination of an engine having an inlet valve for controlling the supply of actuating fluid to the engine, a generator driven by the engine, a power line, a circuit breaker connecting the generator to the line, a hydraulic motor for moving the valve, a speed governor driven by the engine and a control valve connected to the motor for controlling the flow of fluid to the hydraulic motor, means for rapidly moving the inlet valve under action of the motor in response to opening of the circuit breaker comprising an auxiliary circuit having a switch actuated by the circuit breaker and an electromagnet connected to the control valve, and means for limiting closing movement of the inlet valve comprising another switch in the auxiliary circuit and a member fixed to the valve to open the last named switch in a fixed position of the valve, and a hand-switch in the auxiliary circuit for starting of the engine.

10. The combination of an elastic fluid turbine, a generator driven by the turbine, a power line, a circuit breaker connecting the power line to the generator, an inlet valve for the turbine for controlling the flow of elastic fluid thereto, a control mechanism including a speed governor for positioning the valve in response to speed changes of the turbine, means for reducing the time lag of the speed governor at sudden considerable decreases in load without affecting the speed governor operation, said means comprising an electromagnet connected to the control mechanism, an auxiliary electric circuit including a switch for energizing the magnet, the switch being mechanically connected to the circuit breaker and normally held open, means for automatically opening the circuit breaker and closing the switch in response to a sudden drop of load in the power line, and means effective under any load condition for automatically rendering the time lag reducing means ineffective comprising a switch in the auxiliary circuit and a member on the control mechanism for automatically opening the switch to deenergize said magnet as the inlet valve reaches a certain closing position.

ROBERT H. COLLINGHAM.